United States Patent [19]
Schulz et al.

[11] Patent Number: 5,906,792
[45] Date of Patent: *May 25, 1999

[54] NANOCRYSTALLINE COMPOSITE FOR HYDROGEN STORAGE

[75] Inventors: Robert Schulz, Ste-Julie; Sabin Boily, Montreal; Jacques Huot, Ste-Julie; John Strom-Olsen, Westmount; Leszek Zaluski; Alicja Zaluska, both of Montreal, all of Canada

[73] Assignee: Hydro-Quebec and McGill University, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/587,588

[22] Filed: Jan. 19, 1996

[51] Int. Cl.$^6$ ........................................ C01B 6/24
[52] U.S. Cl. ................ 420/900; 148/420; 419/6
[58] Field of Search ............ 420/900; 428/649, 428/656; 423/647, 658.2; 148/420; 419/6

[56] References Cited

U.S. PATENT DOCUMENTS

| | | | |
|---|---|---|---|
| 4,385,726 | 5/1983 | Bernauer et al. | 237/12.3 |
| 4,389,326 | 6/1983 | Tanguy et al. | 252/188.26 |
| 4,436,539 | 3/1984 | Ron et al. | 62/4 |
| 5,536,586 | 7/1996 | Tsushio et al. | 428/649 |

FOREIGN PATENT DOCUMENTS

| | | | |
|---|---|---|---|
| 0 671 357 | 9/1995 | European Pat. Off. | |
| 2386428 | 11/1978 | France | |
| 44 05 497 | 8/1994 | Germany | |
| 94/12695 | 6/1994 | WIPO | 420/900 |

OTHER PUBLICATIONS

L. Guoxian et al., "Hydrogen Absorption and Desorption Characteristics of Mechanically Milled Mg–35wt.%FeTi$_{1.2}$ Powders", Journal of Alloys and Compounds, 1994, pp. 1–4.

P. Mandal et al., "Synthesis, Characterization and Hydrogenation of Behaviour of Mg–xwt.%FeTi(Mn) and La$_2$Mg$_{17}$ xwt.%LaNi$_5$ New Hydrogen Storage Composite Alloys", Journal of Alloys and Compounds, 184(1992), pp. 1–9.

Z. Ye et al., "Hydride Formation in Mg–ZrFe$_{1.4}$Cr$_{0.6}$ Composite Material", Journal of Alloys and Compounds, 209 (1994), pp. 117–124.

S. Orimo et al., "Synthesis of Fine Composite Particles for Hydrogen Storage, Starting from Mg–YNi$_2$ Mixture", Journal of Alloys and Compounds, vol. 210, Aug. (1994), pp. 37–43.

Hydrogen Absorption and Desorption Characteristics of Mechanically Milled Mg–35wt.%FeTi$_{1.2}$ Powders, Journal of Alloys and Compounds, vol. 223, No. 1, May (1995), pp. 111–114.

Patent Abstracts of Japan, Pub No. 02240225, Date Sep. 1990.

(List continued on next page.)

*Primary Examiner*—Sikyin Ip
*Attorney, Agent, or Firm*—Foley & Lardner

[57] ABSTRACT

Disclosed is a nanocrystalline composite useful for hydrogen storage, which provides optimum hydrogenation conditions along with high hydrogen storage capacity. This composite is the combination of at least one high temperature metal hydride such as Mg or Mg$_2$Ni, which has a high hydrogen storage capacity by weight but requires high temperatures for hydrogen absorption and desorption, with at least one low temperature metal hydride such as FeTi, LaNi$_5$, Nb, Mn or Pd, which has a low hydrogen storage capacity by weight but does not require high temperatures for hydrogen absorption and desorption. The high and low temperature metal hydrides are in direct contact with each other and each in the form of a nanocrystalline powder or layer. This composite is particularly useful as a hydrogen supply source for hydrogen-fueled vehicles.

11 Claims, 2 Drawing Sheets

OTHER PUBLICATIONS

P. Mandal et al., "Hydrogenation Behaviour of the New Composite Storage Material Mg–x% FeTi", Journal of Alloys and Compounds, 205 (1994), pp. 111–118.

M. Y. Song, "Effects of Mechanical Alloying on the Hydrogen Storage Characteristics of Mg–xwt% Ni(x=0, 5, 10, 25 and 55) Mixtures", Int. J. Hydrogen Energy, vol. 20, No. 3, 1995, pp. 221–227.

M. Terzieva et al., "Hydriding and Dehydriding Characteristics of Mixtures with a High Magnesium Content Obtained by Sintering and Mechanical Alloying", Int. J. Hydrogen Energy, vol. 20, No. 1, 1995, pp. 53–58.

NANOCRYSTALLINE COMPOSITE FOR HYDROGEN STORAGE

BACKGROUND OF THE INVENTION a) Field of the Invention

The present invention relates to a nanocrystalline composite for use to store hydrogen.

The invention also relates to methods of preparing such composite and to their use.

b) Brief Description of the Prior Art

The main reasons to develop and use a composite are essentially (1) to take advantage of the unique properties of each component of the composite and (2) to profit from its complex (multi-component) microstructure.

In the case of a composite for use to store hydrogen, the purpose of combining two or more hydrogen carriers is essentially to be able to modify the hydrogenation/dehydrogenation properties of the resulting composite in such a way as to provide a wider range of operational conditions.

Although a large variety of hydrogen carriers exists, which mainly consist of metal hydrides operating at temperatures ranging between −40° C. and 500° C. there is no suitable hydrogen carrier which provides optimum hydrogenation conditions along with a high hydrogen storage capacity. By way of examples, in the case of a hydrogen-fueled vehicle, such "optimum" hydrogenation conditions would be an ability to absorb/desorb hydrogen at a temperature of about 150° C. while a "high" hydrogen storage capacity would be an ability for the carrier to store more than 3% by weight of hydrogen.

So far, there is no hydrogen carrier which can meet both of these requirements. Indeed, all the hydrogen carriers which can operate at temperatures lower than 100° C. have a hydrogen storage capacity by weight that is too low to be effective in transportation. For example, FeTi has a storage capacity of 1.9 wt % while LaNi$_5$ has a capacity of 1.3 wt %. On the other hand, all the hydrogen carriers which exhibit a high hydrogen storage capacity, such as, for example Mg$_2$Ni which has a capacity of 3.6 wt % or Mg which has a capacity of 7.65 wt %, require temperatures higher than 300° C. for hydrogenation/dehydrogenation cycling. Of course, the need for high temperature (usually ranging from 300 to 400° C. for absorption/desorption decreases the efficiency of such carriers and the potential development and use of vehicles using hydrogen as a fuel.

In copending U.S. patent application Ser. Nos. 08/382,776 and 387,457 filed on Feb. 2 and 13, 1995, respectively in the name of the same assignees, a new generation of hydrogen carriers is disclosed, which consist of nanocrystalline metal hydride powders incorporating or not a catalyst.

More particularly, U.S. application Ser. No. 08/387,457 discloses a powder of an alloy of Ni and Mg, La, Be or Ti, consisting of crystallites having a grain size lower than 100 nm and preferably lower than 30 nm and a crystalline structure allowing hydrogen absorption. This powder is preferably obtained by mechanical grinding and may consist of crystallites of Mg$_2$Ni, LaNi$_5$ or of Ni-based alloys of Be or Li. It is particularly useful for storing and transporting hydrogen, since it requires no or only one single activation treatment at low temperature to absorb hydrogen and its kinetic of absorption and diffusion of hydrogen is fast.

U.S. application Ser. No. 08/382,776 discloses a very light-weight, Mg and Be-based material which has the ability to reversibly store hydrogen with very good kinetics. This material is of the formula:

$$(M_{1-x}A_x)D_y$$

wherein:

M is Mg, Be or a combination of them;

A is an element selected from the group consisting of Li, Ca, Ti, V, Cr, Mn, Fe, Co, Ni, Cu, Zn, Al, Y, Zr, Nb, Mo, In, Sn, O, Si, B, C and F D is a metal selected from the group consisting of Fe, Co, Ni, Ru, Rh, Pd, Ir and Pt (preferably Pd);

x is a number ranging from 0 to 0.3; and y is a number ranging from 0 to 0.15.

This material is in the form of a powder of particles of the formula $M_{1-x}A_x$ as defined hereinabove, each particle consisting of nanocrystalline grains having an average size of 3 to 100 nm or having a nanolayered structure with a layer spacing of 3 to 100 nm. Some of these particles have clusters of metal D attached thereto, with an average size ranging from 2 to 200 nm.

The nanocrystalline powders disclosed in both of the above U.S. applications overcome most of the drawbacks of the conventional hydrides, including:

the problems of poisoning by oxidation;

the need for activation; and too slow kinetics of hydrogenation/dehydrogenation.

The latter point is essential since outstanding kinetics of hydrogen uptake permits to decrease significantly the effective operational temperature of, for example, the Mg-based hydrides, to a range inaccessible for conventional, polycrystalline materials (for example 200 to 250° C.).

In spite of the above advantages, many potential applications for hydrogen carriers, especially, metal hydrides, require a cold star-up of the hydrogen-fueled devices, which means ambient temperature for the initiation of the process, with the possibility of gradually switching to higher temperatures as the device warms up.

SUMMARY OF THE INVENTION

The object of the present invention is to provide a new product hereinafter called "nanocrystalline composite", which has all the advantages of the above mentioned nanocrystalline hydrides, but also allows "designing" of the hydrogenation/dehydrogenation performance to meet a given specification.

This object is achieved with a nanocrystalline composite particularly useful for hydrogen storage, which comprises in combination:

a) at least one first hydrogen carrier hereinafter called "high temperature metal hydride", which has a high hydrogen storage capacity but requires high temperatures for hydrogen absorption and desorption; and b) at least one second hydrogen carrier hereinafter called "low temperature metal hydride", which has a low hydrogen storage capacity but does not require high temperatures for hydrogen absorption and desorption.

In accordance with the invention, the high and low temperature metal hydrides are in direct contact with each other and each in the form of a nanocrystalline powder.

This powder consists of particles and the term "nanocrystalline" as used herein means that the particles have nanocrystalline grains with an average size of 3 to 100 nm, or a nanolayered structure with a layer spacing of 3 to 100 nm.

By way of non-restrictive examples, the high temperature metal hydrides may consist of Mg, Mg$_2$Ni, Na, Cs, and possibly Be, and Li alloys. Conversely, the low temperature metal hydrides may consist of alloys such as FeTi and LaNi$_5$, or metals such as Nb, Mn, and Pd.

As can be understood, the main idea of the invention is to utilize at least two different kinds of metal hydrides which operate at different temperatures, thereby allowing for multistage hydrogenation/dehydrogenation cycles.

The low-temperature metal hydride (for example FeTi or LaNi$_5$) is responsible for the cold start-up of the device when use is made of the composite according to the invention as a source of fuel. This low-temperature metal hydride which may represent 30% only of the total weight of the composite, does not significantly reduce the total hydrogen storage capacity of the system. It releases hydrogen at ambient temperature, if only hydrogen pressure in the container is lower than a certain value (for example less than 5 bars). The initially desorbed hydrogen may be used immediately for combustion purposes.

After the device is started up, especially when such device is a combustion engine, like the motor of a car, temperatures high enough will be provided by the same to carry on desorption from the high-temperature metal hydride (Mg, Mg$_2$Ni or their alloys with other elements), which is the other component of the composite.

During cooling down of the device after it has been switched off, the combination of two different metal hydrides also has an additional advantage. Desorption from the high-temperature hydride may still proceed after switching-off of the device, if the temperature is not immediately reduced. In such a case, any excess of unused hydrogen gas will be absorbed by the low-temperature hydride in contact with the high temperature metal hydride in the course of cooling, thereby allowing for the next cold start-up of the device.

In the above description, reference has been made to the supply of a hydrogen-operated car motor as a potential use of the invention. Of course, it should be understood that such an application is not the only one, as the same advantages of the composite according to the invention could also benefit to heat pumps, generators and the like.

The invention, its methods of preparation and its use and advantages will be better understood upon reading the following non-restrictive detailed description thereof.

DETAILED DESCRIPTION OF THE INVENTION

Figure 1:
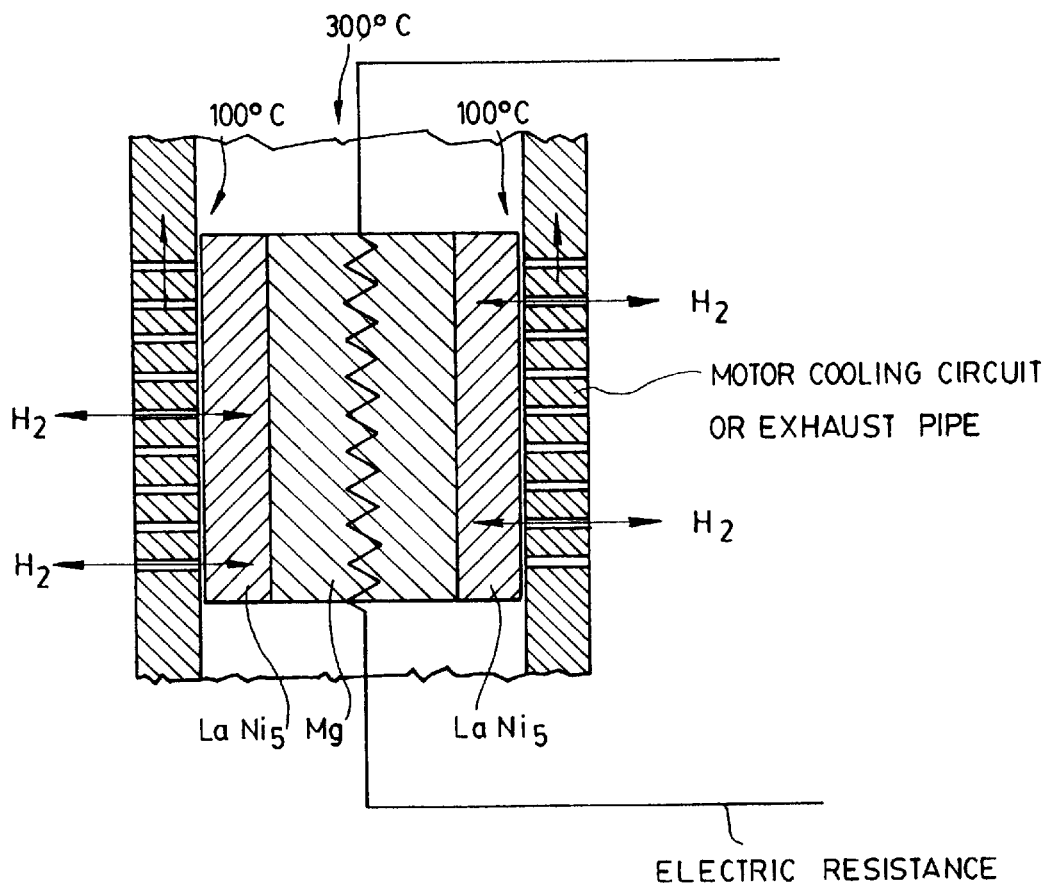
FIG. 1 is a schematic, cross-sectional representation of a nanocrystalline alloy according to the invention, in the form of compressed layers of high and low temperature nanocrystalline metal hydrides.

As aforesaid, the nanocrystalline composite according to the invention is particularly useful for hydrogen storage, inasmuch as it provides optimum hydrogenation conditions along with a high hydrogen storage capacity.

This composite is made of two or more components including:

a) at least one first hydrogen carrier hereinafter called "high temperature metal hydride", which has a high hydrogen storage capacity by weight but requires high temperatures for hydrogen absorption and desorption; and b) at least one second hydrogen carrier hereinafter called "low temperature metal hydride", which has a low hydrogen storage capacity by weight but does not require high temperatures for hydrogen absorption and desorption.

As high temperature metal hydride, use can be made of Mg, Na, Cs, or Mg$_2$M. These materials are able to absorb a high amount of hydrogen (3.6 wt % in the case of Mg$_2$Ni; 7.65 wt % in the case of Mg), but high temperatures only (higher than 200° C.).

As low temperature metal hydride, use can be made of alloys such as FeTi or LaNi$_5$, or metals such as Nb, V, Mn and Pd. All of these materials are able to absorb and desorb hydrogen at low temperatures ranging from ambient temperature to 100° C. but in much smaller amount in weight % than Mg or Mg$_2$Ni. Thus, for example, FeTi may absorb up to 1.9 wt % of hydrogen whereas LaNi$_5$ may absorb up to 1.3 wt % of hydrogen only.

In accordance with a very important aspect of the invention, the high and low temperature metal hydrides must be in direct contact with each other and each of them must be in the form of a nanocrystalline powder or lawyer. This nanocrystalline structure is essential in obtaining the expected performance in hydrogenation/dehydrogenation cycles. Indeed, very good kinetics are achieved by enhanced hydrogen diffusion on grain boundaries and defects.

Each of these powders can be prepared directly from chunks of metal(s). This direct preparation can be carried out as is disclosed in the above referenced U.S. patent application Ser. Nos. 08/382,776 and 387,457, both of which are incorporated herewith by reference.

More particularly, such direct preparation can be carried out in a very simple yet efficient manner, by merely grinding at ambient temperature under an inert atmosphere, a powder of the metal to be reduced to a nanocrystalline form, or a mixture of powders of two different metals, such as Ni and Mg, in amounts selected to obtain the requested composition. To be efficient, this grinding must be carried out under high energy conditions for several hours, typically 20 h for reducing the particle size of the metal to the requested value, and from 30 to 40 h for forming an alloy of metal and reducing its particle size to the requested valve. This grinding allows the preparation by mechanical alloying of the requested alloy from powders of Ni and of the other metal and at the same time reduces the crystal size to the requested value.

From a practical standpoint, this intense grinding can be carried out with a high energy ball milling machine. By way of examples of such ball milling machines, reference can be made to those sold under the trademarks SPE 8000, FRITCH and ZOZ.

In the case where powders of different metals are used, such an intense grinding under an inert atmosphere (like argon) causes the different metals to react while the powders are ground, and leads to the formation of the corresponding crystalline alloy particles. Such is particularly interesting since this allows for the direct synthesis of alloys in the solid state, such as for example, Mg$_2$Ni, that are usually very difficult to obtain by melting and cooling.

In order to further improve the quality and efficiency of the nanocrystalline powders used in accordance with the invention, a small amount typically of 1% by weight, of a material capable of catalysing the dissociation of the hydrogen molecule, such as, for example, palladium, can and should preferably be applied onto the surface of the nanocrystalline particles. This material can be applied in a very simple manner, by grinding for a shorter period of time the synthesized nanocrystalline particles with a powder of the catalyst material. This subsequent grinding causes clusters of the catalyst, like palladium, to be deposited onto the surface of the crystalline particles. It is however compulsory that this supplemental grinding be not too long, since, otherwise, a new intermetallic alloy could be formed.

After every one of the powders of high and low temperature metal hydrides have been prepared, they must be combined together to form the requested nanocrystalline composite.

In accordance with a first embodiment of the invention, the composite can be prepared by intermixing the powders of low and high temperature metal hydrides and by compressing the resulting mixture at ambient or low temperature. This compression step is important for two reasons. First of all, it ensures that both metal hydrides are in direct contact. Such is important because the low-temperature hydride has a catalytic effect on the absorption of the high-temperature hydride. Besides, the particles of the low-temperature hydride prevent sintering of the high-temperature hydride at elevated temperatures. The high-temperature hydrides are usually Mg-based and are sensitive to sintering at elevated temperatures. This is a disadvantage because sintering reduces the active surfaces and interfaces available for hydrogen absorption/desorption. Such disadvantage is partly overcome thanks to the presence of the low-temperature hydride in the campsite.

The intermixing (or admixture) of the two powders can be made in the same grinder as was used for their preparation and can be combined to a supplemental grinding step to further reduce the size of the particles.

In this connection, it is worth mentioning that this method of preparation is substantially different from the one disclosed by Liang Guoxian et al in their article entitled "Hydrogen absorption and desorption characteristics of mechanically milled Mg-35 wt % FeTi$_{1.2}$ powders" (Journal of Alloys and Compounds, not published yet). Indeed, in the method disclosed in this article, the FeTi alloy is first prepared by arc melting and crushed into a powder of less than 80 mesh. Then, this powder is mixed with a Mg powder and the resulting mixture is subjected to "intensive" mechanical grinding in an attritor ball-mill under an inert atmosphere. The resulting product is in the form of nanocrystalline particles but is not a mixture of separate particles of the original Mg and FeTi powders, as is obtained and actually required in the present invention. Rather, in the method of Liang Guoxian et al, the resulting particles essentially consist of an alloy of Mg, Fe and Ti, as, during the grinding step carried out on the powders originally in a non-nanocrystalline form, interdiffusion occurs between these powders (this mechanism is actually the same as the one used to produce the nanocrystalline alloy powders disclosed in the above mentioned U.S. patent applications).

Even in the case where, in accordance with the present invention, the mixture of nanocrystalline powders of high and low temperature metal hydrides is subjected to a supplemental grinding step, such will be different from what is disclosed by Liang Guoxian et al. Indeed, when the powders used as starting materials are already in a nanocrystalline form, further grinding will not cause interdiffusion of the alloys and/or metal, as occurs when one starts from conventional crystalline particles. As a matter of fact, in the invention, only a fine dispersion of nanocrystalline particles will be obtained, with no or very little modification of the physical characteristics of each material.

If this first embodiment has proved to be efficient (see the following example), it has also been found that, with this kind of composite made of intermixed powders, hydrogen may be "trapped" in the high temperature metal hydride during desorption at low temperature. To prevent such drawback, and ensure that a sufficient amount of hydrogen be always present in the low temperature metal hydride, it would be advisable that the low temperature metal hydride (viz. LaNi$_5$, FeTi, . . . ) surrounds and encloses the high temperature metal hydride (viz. Mg, Mg$_2$Ni).

Thus, in accordance with a second embodiment of the invention, the composite can be prepared in such a manner as to form a sandwich structure comprising an inner layer made of a compressed nanocrystalline powder of a high temperature metal hydride, such as for example Mg, which is compressed between two opposite outer layers, each of which is made of a compressed nanocrystalline powder of a low temperature metal hydride, such as for example LaNi$_5$. This embodiment is shown in FIG. 1 of the accompanying drawings.

The sandwich structure shown in FIG. 1 can be obtained by pouring a given amount of nanocrystalline LaNi$_5$ powder into the matrix of a mold and subjecting the so-poured amount to a light pressure to form a first layer. Then, the mold is opened and an amount of a nanocrystalline Mg powder is poured onto the first layer and pressed to form a second layer onto the first one. Advantageously, an electric resistance can be inserted into the mold together with the Mg powder so as to be embedded into the same as shown in FIG. 1. Finally, the mold is opened again and another amount of nanocrystalline LaNi$_5$ powder is poured into the mold onto the second compressed layer and pressed to form a third layer on top of the second one.

The resulting composite is in the form of a sandwich "panel" containing a core made, of the high temperature metal hydride, which is squeezed between two outer layers of the low temperature metal hydride.

In use, lowering of the external pressure surrounding this composition will allow immediate desorption and release of the hydrogen contained in the outer layers of LaNi$_5$. This will allow for starting up the engine. As soon as the same starts heating up, its heat and electrical energy produced by an alternator connected to the same will become available to heat the core of Mg and thus allow for the hydrogen contained in greater amount into this core, to be desorbed.

Figure 2:
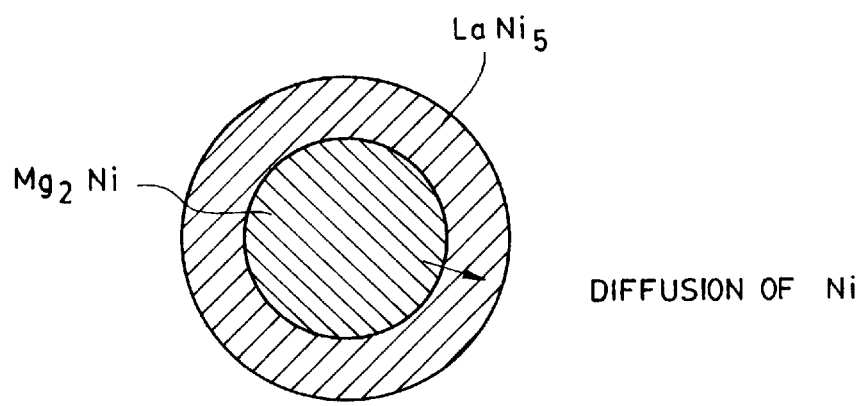
FIG. 2 is a schematic, cross-sectional representation of a nanocrystalline alloy according to the invention, in the form of a core made of a high temperature metal hydride coated with a surface layer of a low temperature metal hydride.

In accordance with a third embodiment of the invention, another kind of effective, non-homogeneous nanocrystalline composite can be prepared in such a manner that each particle is in the form of a core made of a high temperature metal hydride such as for example Mg$_2$Ni that is coated by a surface layer of a low temperature metal hydride such as, for example, LaNi$_5$. This third embodiment is illustrated in FIG. 2 of the accompanying drawings.

Such a structure can be obtained in different ways.

A first one basically consists in preparing a nanocrystalline Mg$_2$Ni alloy by high energy mechanical grinding, as is disclosed in U.S. patent application Ser. No. 08/387,457. Advantageously, a catalyst should be added to the starting metal powders to form catalyst clusters onto the surface of the resulting alloy, as is also disclosed in the above application. During this grinding step, additional Ni will also be added to the mixture in order to over-saturate the alloy with Ni. Then, pure La will be added to the alloy and the resulting mixture is subjected to further high energy mechanical grinding. Since La in a metal state is more ductile than the nanocrystalline alloy, it will coat the alloy. After such is done, the coated particles will be subjected to a thermal treatment (annealing). Such will cause the Ni surplus in the alloy to diffuse toward the external La coating and then form particles having a $Mg_2Ni$ core and a $LaNi_5$ external coating.

Another way of obtaining this structure would be to subject to a high energy mechanical grinding, a mixture of Mg particles with particles of another metal known to absorb hydrogen at low temperature, like Nb, V, Mn or Pd. These other metals are known to be "naturally" non-miscible with Mg. However, with such a high energy grinding, an oversaturated solution of both Mg and the other metal will be formed. Subsequent heat treatment (annealing) of the solution will cause the other metal, for example Nb, to diffuse toward the external surface of the particles, thereby resulting in particles having a central core mainly of Mg and an external coating mainly of Nb. Temperature during the annealing should be kept low enough so that excessive grain growth do not occur during heat treatment, the microstructure remaining nanocrystalline.

As aforesaid, the nanocrystalline composite according to the invention can be used to operate a hydrogen-fueled vehicle. By way of example, a composite combining from 5 to 30 wt %, preferably 20 wt % of a low temperature hydrogen carrier with from 95 to 70%, preferably 80 wt %, of a high temperature hydrogen carrier will allow starting up of a cold motor thanks to the low temperature metal hydride, and subsequent operation of the motor over a long distance thanks to the high storage capacity of the high temperature metal hydride that will start become operative and useful as soon as the motor is hot. So, for a same amount of hydrogen-absorbing medium, a much better efficiency will be achieved.

EXAMPLE

A nanocrystalline Mg—Fe Ti composite was prepared by mixing nanocrystalline powders of Mg and FeTi (70 wt % and 30 wt % respectively) prepared in a high energy ball-milling machine FRITCH. During the mixing step that was carried out in the same machine, 0.8 wt % of palladium was added as a catalyst.

Then, the resulting mixture was compressed into a tablet which was placed in the reaction chamber of an automated gas titration apparatus. The reaction chamber was evacuated and hydrogen gas was admitted under a pressure of 9 bars at room temperature. Temperature cycling was carried on between room temperature and a temperature of 200° C. to achieve absorption/desorption of the Mg-based alloy.

Figure 3:
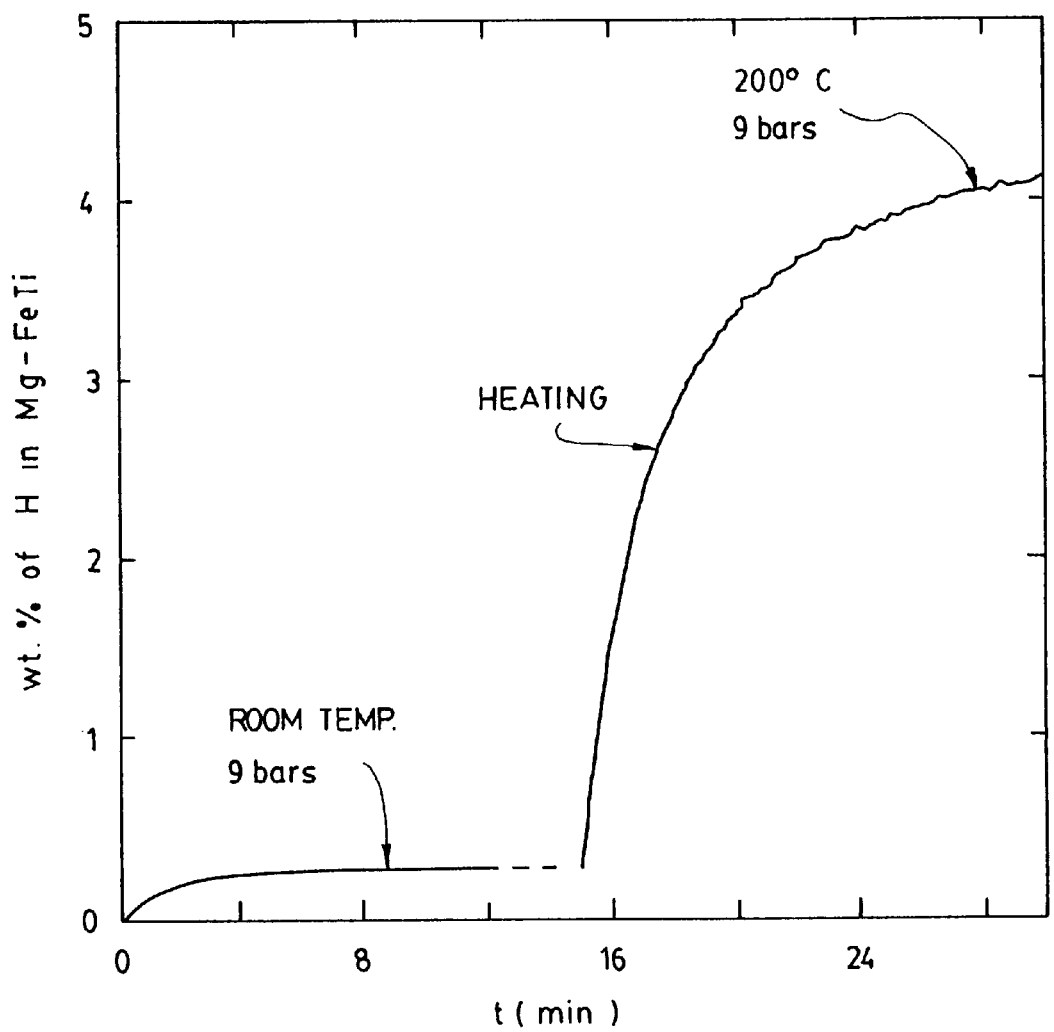
FIG. 3 is a diagram giving the percentage by weight of hydrogen absorbed in a nanocrystalline composite of Mg and FeTi as a function of time at a temperature ranging from the room temperature to 200° C. under a pressure of 9 bars.

FIG. 3 shows the result of this two-stage hydrogenation process. FeTi absorbed hydrogen at room temperature and the Mg-based alloy at high temperature. The total hydrogen storage capacity of the composite was above 4 wt %.

What is claimed is:

1. A nanocrystalline composite for hydrogen storage, said composite consisting essentially of:
   a) at least one first hydrogen carrier hereinafter called "high temperature metal hydride", which has a high hydrogen storage capacity by weight but requires high temperatures for hydrogen absorption and desorption; and
   b) at least one second hydrogen carrier hereinafter called "low temperature metal hydride", which has a low hydrogen storage capacity by weight but does not require high temperatures for hydrogen absorption and desorption, wherein said at least one high temperature metal hydride is selected from the group consisting of Mg, Na, Cs, $Mg_2Ni$, or their alloys with other elements, Be alloys and Li alloys and said at least one low temperature metal hydride is selected from the group consisting of FeTi, $LaNi_5$, Ni, V, Mn, and Pd;

wherein said composite comprises from 70 to 95% by weight of said at least one high temperature metal hydride and from 5 to 30% by weight of said at least one low temperature metal hydride; and wherein said at least one high temperature metal hydride and said at least one low temperature metal hydride are in contact with each other and each in the form of a nanocrystalline powder.

2. The nanocrystalline composite of claim 1, wherein the nanocrystalline powder of said at least one high temperature metal hydride is in admixture with the nanocrystalline powder of said at least one low temperature metal hydride, and said admixed powders are compressed.

3. The nanocrystalline composite of claim 1, wherein the nanocrystalline powder of said at least one high temperature metal hydride is compressed and forms an inner layer that is compressed between two outer layers of the nanocrystalline powder of said at least one low temperature metal hydride, which is also compressed.

4. The nanocrystalline composite of claim 3, wherein the inner layer made of said nanocrystalline powder of said at least one high temperature metal hydride comprise a heating element.

5. The nanocrystalline composite of claim 1, wherein the nanocrystalline powder of said at least one high temperature metal hydride is in the form of cores coated by a surface layer of the nanocrystalline powder of said at least low temperature metal hydride.

6. The nanocrystalline composite of claim 1, wherein said at least one high temperature material includes a mixture of $Mg_2Ni$ and Mg. of said at least low temperature metal hydride.

7. The nanocrystalline composite of claim 1, produced by a process comprising the steps of:
   (a) preparing at least one first hydrogen carrier hereinafter called "high temperature metal hydride", which has a high hydrogen storage capacity by weight but requires high temperatures for hydrogen absorption and desorption, wherein said at least one high temperature metal hydride is in the form of a nanocrystalline powder and is selected from the group consisting of Mg, Na, Cs, $Mg_2Ni$, or their alloys with other elements, Be alloys and Li alloys;
   (b) separately preparing at least one second hydrogen carrier hereinafter called "low temperature metal hydride", which has a low hydrogen storage capacity by weight but does not require high temperatures for hydrogen absorption and desorption, wherein at least one low temperature metal hydride is in the form of a nanocrystalline powder and is selected from the group consisting of FeTi, $LaNi_5$, Nb, V, Mn, and Pd;
   (c) combining said high temperature metal hydride nanocrystalline powder and said low temperature metal hydride nanocrystalline powder by mixing and compression to bring said high temperature metal hydride and low temperature metal hydride into contact with each other.

8. The nanocrystalline composite of claim 1, wherein the nanocrystalline powders of said at least one high temperature metal hydride and said at least one low temperature metal hydride, include a hydrogen dissociation catalyst.

9. The nanocrystalline composite of claim 8, wherein said catalyst consists of clusters of Pd.

10. The nanocrystalline composite of claim 1, wherein said at least one high temperature metal hydride is $Mg_2Ni$ or a mixture of $Mg_2Ni$ and Mg.

11. A process for producing nanocrystalline composite for hydrogen production according to claim 1, comprising:

(a) preparing at least one first hydrogen carrier hereinafter called "high temperature metal hydride", which has a high hydrogen storage capacity by weight but requires high temperatures for hydrogen absorption and desorption, wherein said at least one high temperature metal hydride is in the form of a nanocrystalline powder and is selected from the group consisting of Mg, Na, Cs, $Mg_2Ni$, or their alloys with other elements, Be alloys and Li alloys;

(b) separately preparing at least one second hydrogen carrier hereinafter called "low temperature metal hydride", which has a low hydrogen storage capacity by weight but does not require high temperatures for hydrogen absorption and desorption, wherein at least one low temperature metal hydride is in the form of a nanocrystalline powder and is selected from the group consisting of FeTi, $LaNi_5$, Nb, V, Mn and Pd;

(c) combining said high temperature metal hydride nanocrystalline powder and said low temperature metal hydride nanocrystalline powder by mixing and compression to bring said high temperature metal hydride and low temperature metal hydride into contact with each other.

\* \* \* \* \*